US010700949B1

(12) United States Patent
Eberlein (10) Patent No.: US 10,700,949 B1
(45) Date of Patent: Jun. 30, 2020

(54) STACKING OF TENTANT-AWARE SERVICES (71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/219,375

(22) Filed: Dec. 13, 2018

(51) Int. Cl.
H04L 12/24 (2006.01)
G06F 9/50 (2006.01)
H04L 29/08 (2006.01)

(52) U.S. Cl.
CPC ........ *H04L 41/5054* (2013.01); *G06F 9/5072* (2013.01); *G06F 9/5077* (2013.01); *H04L 41/0293* (2013.01); *H04L 41/5058* (2013.01); *H04L 67/16* (2013.01); *H04L 67/2809* (2013.01)

(58) Field of Classification Search
CPC ............. H04L 41/5054; H04L 41/0293; H04L 41/5058; H04L 67/16; H04L 67/2809; G06F 9/5077
USPC ........................................................ 709/222
See application file for complete search history.

(56) References Cited

U.S. PATENT DOCUMENTS

| 5,680,573 | A | 10/1997 | Rubin et al. |
| 5,925,100 | A | 7/1999 | Drewry et al. |
| 5,946,647 | A | 8/1999 | Miller et al. |
| 6,055,569 | A | 4/2000 | O'Brien et al. |
| 6,728,726 | B1 | 4/2004 | Bernstein et al. |
| 6,996,680 | B2 | 2/2006 | Mogi et al. |
| 7,284,096 | B2 | 10/2007 | Schreter |
| 7,523,142 | B2 | 4/2009 | Driesen et al. |
| 7,529,895 | B2 | 5/2009 | Blumrich et al. |
| 7,558,822 | B2 | 7/2009 | Fredricksen et al. |
| 7,657,575 | B2 | 2/2010 | Eberlein et al. |
| 7,720,992 | B2 | 5/2010 | Brendle et al. |
| 7,734,648 | B2 | 6/2010 | Eberlein |
| 7,739,387 | B2 | 6/2010 | Eberlein et al. |
| 7,894,602 | B2 | 2/2011 | Mueller et al. |
| 7,941,609 | B2 | 5/2011 | Almog |
| 7,962,920 | B2 | 6/2011 | Gabriel et al. |
| 7,971,209 | B2 | 6/2011 | Eberlein et al. |
| 8,126,919 | B2 | 2/2012 | Eberlein |

(Continued)

OTHER PUBLICATIONS

U.S. Appl. No. 14/960,983, filed Dec. 7, 2015, Eberlein, et al.

(Continued)

*Primary Examiner* — Tauqir Hussain
(74) *Attorney, Agent, or Firm* — Fish & Richardson P.C.

(57) ABSTRACT

Methods and systems are used for using services in stacked services. As an example, a first service instance of a first service bound to a first application is instantiated. A second service instance of a second service is instantiated from within a first service broker. The second service instance is bound to the first service to be used indirectly in a context of the first application. A subaccount of the first application is provided to the second service as a first consumer. A third service instance of a third service is instantiated from within a second service broker. The third service instance is bound to the second service to be used indirectly in a context of the first application. The first application uses the second service indirectly through the first service. The subaccount of the first application is provided to the third service as the first consumer.

20 Claims, 6 Drawing Sheets

(56) References Cited

U.S. PATENT DOCUMENTS

| | | |
|---|---|---|
| 8,200,634 B2 | 6/2012 | Driesen et al. |
| 8,225,303 B2 | 7/2012 | Wagner et al. |
| 8,250,135 B2 | 8/2012 | Driesen et al. |
| 8,275,829 B2 | 9/2012 | Plamondon |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |
| 8,326,830 B2 | 12/2012 | Hollingsworth |
| 8,356,010 B2 | 1/2013 | Driesen |
| 8,375,130 B2 | 2/2013 | Eberlein et al. |
| 8,380,667 B2 | 2/2013 | Driesen |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,510,710 B2 | 8/2013 | Harren et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,577,960 B2 | 11/2013 | Boller et al. |
| 8,600,916 B2 | 12/2013 | Chen et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 * | 4/2014 | Hartig .................. G06F 21/52 370/395.53 |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,525 B2 | 5/2015 | Harren et al. |
| 9,026,857 B2 | 5/2015 | Becker et al. |
| 9,031,910 B2 | 5/2015 | Driesen |
| 9,032,406 B2 * | 5/2015 | Eberlein ................ G06F 9/4881 715/751 |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,251,183 B2 * | 2/2016 | Mandelstein ......... G06F 16/211 |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,436,724 B2 | 9/2016 | Driesen et al. |
| 9,724,757 B2 | 8/2017 | Barrett |
| 2004/0117398 A1 | 6/2004 | Idei et al. |
| 2006/0069715 A1 | 3/2006 | Vayssiere |
| 2006/0098253 A1 | 5/2006 | Masuno et al. |
| 2008/0120129 A1 | 5/2008 | Seubert et al. |
| 2010/0023925 A1 | 1/2010 | Shribman et al. |
| 2010/0153341 A1 | 6/2010 | Driesen et al. |
| 2012/0089664 A1 | 4/2012 | Igelka |
| 2012/0284080 A1 | 11/2012 | Oliveira et al. |
| 2013/0007259 A1 | 1/2013 | Pacheco-Sanchez et al. |
| 2013/0167079 A1 | 6/2013 | Ari et al. |
| 2013/0325672 A1 | 12/2013 | Odenheimer et al. |
| 2013/0332424 A1 | 12/2013 | Nos et al. |
| 2014/0047319 A1 | 2/2014 | Eberlein |
| 2014/0068703 A1 * | 3/2014 | Balus .................. H04L 41/0893 726/1 |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0120938 A1 * | 4/2015 | Mordani ............. H04L 41/5041 709/226 |
| 2015/0178332 A1 | 6/2015 | Said et al. |
| 2019/0102280 A1 * | 4/2019 | Caldato .................. H04L 67/10 |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/167,746, filed May 27, 2016, Burkhardt et al.
U.S. Appl. No. 15/285,715, filed Oct. 5, 2016, Specht et al.
U.S. Appl. No. 15/285,745, filed Oct. 5, 2016, Mayer.
U.S. Appl. No. 15/356,190, filed Nov. 18, 2016, Eberlein, Peter.
U.S. Appl. No. 15/461,236, filed Mar. 16, 2017, Richter et al.
U.S. Appl. No. 15/581,459, filed Apr. 28, 2017, Eberlein, et al.
U.S. Appl. No. 15/593,830, filed May 12, 2017, Eberlein, et al.
U.S. Appl. No. 15/847,627, filed Dec. 19, 2017, de Boer, et al.
U.S. Appl. No. 15/970,499, filed May 3, 2018, Eberlein, et al.
U.S. Appl. No. 16/173,225, filed Oct. 29, 2018, Eberlein et al.
U.S. Appl. No. 16/197,888, filed Nov. 21, 2018, Meissner et al.
U.S. Appl. No. 16/208,920, filed Dec. 4, 2018, Eberlein, et al.

* cited by examiner

STACKING OF TENTANT-AWARE SERVICES

BACKGROUND

Cloud Native Applications (CNAs) can implement microservices architectures in which applications are composed of reusable services. NCAs can provide service reuse, meaning that the same service can be used by multiple applications. Each of the multiple applications needs to isolate their use of a service from the use of the same service by other applications. Each application can create its own instance of a service, and after instance creation, the service can process application requests in the context of a respective service instance bound to a specific application.

However, this type of isolation can fail when, for example, services are consumed indirectly through other services, such as when services are stacked. Stacking can occur, for example, when a main service S1 uses an indirectly-consumed service S2. The isolation can fail, for example, because the main service (for example, S1) traditionally creates just one instance of the indirectly-consumed service (for example, service S2). Service S1 can then use the one service instance (for example, S2) for all of S1's own service instances that 51 provides to consuming applications. Taking this approach can cause the indirectly-consumed service (for example, S2) to lose context information about the application that is consuming the service. This context information may only be available at directly-consumed services (for example, S1). As a result, indirectly-consumed services (for example, S2) cannot maintain isolation of context information at the application level.

SUMMARY

The present disclosure describes techniques for maintaining context information across indirectly-consumed services. In an implementation, a computer-implemented method is used for using services in stacked services. A first service instance of a first service bound to a first application is instantiated. The first service is a directly-consumed service of the first application. A second service instance of a second service is instantiated from within a first service broker. The second service instance is bound to the first service to be used indirectly in a context of the first application. The first application uses the first service directly. A subaccount of the first application is provided to the second service as a first consumer. A third service instance of a third service is instantiated from within a second service broker. The third service instance is bound to the second service to be used indirectly in a context of the first application. The first application uses the second service indirectly through the first service. The subaccount of the first application is provided to the third service as the first consumer. A fourth service instance of the first service bound to a second applications instantiated. The first service is a directly-consumed service of the second application. A fifth service instance of the second service is instantiated from within the first service broker. The fifth service instance is bound to the second service to be used indirectly in a context of the second application. The second application uses the first service directly. A subaccount of the second application is provided to the second service as a second consumer. A sixth service instance of a third service is instantiated from within the second service broker. The sixth service instance is bound to the second service to be used indirectly in the context of the second application. The second application uses the second service indirectly through the first service. The subaccount of the second application is provided to the sixth service as the second consumer.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, context information is preserved in networks of stacked services. Second, stacked services can isolate data for different consumers in different contexts. Third, stacked multi-tenant services can be used in a single tenant application. Fourth, service reusability of services can be increased. Fifth, access credentials can be provided to consumers across the stack. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes techniques for maintaining context information across indirectly-consumed services in the cloud that are used by applications.

The detailed description is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from scope of the disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

While applications can have separate instances of directly-consumed services, services themselves have just one instance of each indirectly-consumed service that they use for all of their consumers. This sharing of service instances can lead to context loss in stacked services. For example, indirectly-consumed services cannot differentiate between consuming applications.

Figure 1:
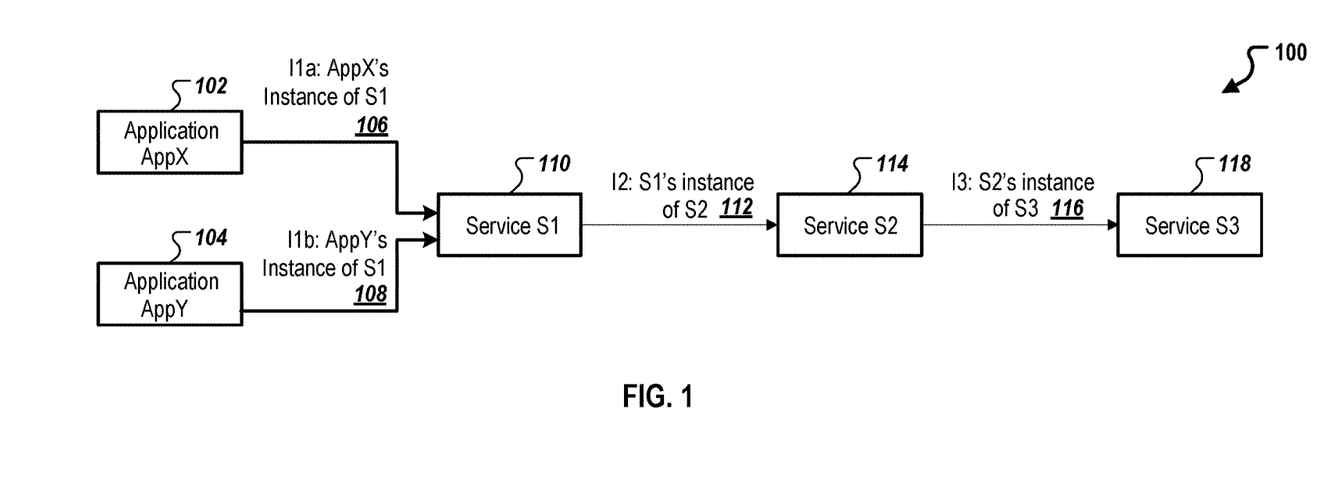
FIG. 1 is a block diagram showing examples of service calls in which context loss occurs in stacked services, according to an implementation of the present disclosure.

FIG. 1 is a block diagram showing examples of service calls 100 in which context loss occurs in stacked services, according to an implementation of the present disclosure. The service calls 100 can be initiated by applications 102 and 104. For example, the applications 102 and 104 can initiate instance creations 106 and 108, respectively, of a service 110. The service 110 can be, for example, a directly-consumed service that is used by many applications including, for example, the applications 102 and 104. The service 110 can, in turn, cause an instance creation 112 of an indirectly-consumed service 114. The indirectly-consumed service 114 can, in turn, cause an instance creation 116 of another indirectly-consumed service 118. In general, a given service can use one or more other services, for example, leading to the instantiation of one or more indirectly-consumed services.

Aspects of the service calls 100 as illustrated in FIG. 1 and how the corresponding services are used can lead to problems associated with data isolation that can be detrimental to tenant-aware services. For example, services 110, 114, and 118 may need to isolate their data not only along a tenant dimension but also along an instance dimension. More specifically, data for the service 114 may need to be isolated for each instance that exists for application 102 and 104. As an example, two customers subscribing to the applications 102 and 104 may result in four data buckets within a service that is reused by both of the applications 102 and 104. Isolation that may occur for the data can depend, for example, on an isolation model of the service. For example, in order to set up data persistence for the four data buckets, the service can require notifications when either a new tenant is on-boarded or when a new service instance is created. For regular single-tenant applications (for example, when only the application 102 exists that uses the service 110 and stacked services) the creation of an instance of the service to be consumed can be sufficient to implicitly perform the required setups in indirectly-consumed services. However, a problem can occur when a directly-consumed service (for example, the service 110) uses a single shared instance of an indirectly-consumed service (for example, the service 114) for all of its own instances. In this case, the indirectly-consumed service is not informed when a new instance of the directly-consumed service is created. The indirectly-consumed service also does not know about the tenant of the consumer creating the directly-consumed service instance. Consequently, the indirectly-consumed service cannot set up any tenant-specific persistence needed.

Additionally, a tenant-aware service, for example, implementing Open Authorization (OAuth) for authentication, needs to provide an OAuth client to its final consumer as a prerequisite for user and tenant propagation from an application down the stack to the service. If the application directly creates the service instance, then the service knows about the application, which is the final consumer. However, if the service is consumed indirectly (by another service), the service only knows about its direct consumer (the other service). In this case, the service that is consumed indirectly does not about the application that is doing the consuming. As a result, the indirectly-consumed service cannot provide an OAuth client to the application as its final consumer.

A first component of a solution that is needed to solve these problems is to prevent the loss of context information. The first component of the solution can include enabling indirectly-consumed services to prepare for new tenants that are creating instances of directly-consumed services. In some implementations, the first component of the solution can be achieved by creating entire networks of service instances consumed indirectly for each directly-consumed service instance.

In some implementations a complete service instance network can be duplicated. For example, a deep copy can be used for each consuming application, which can prevent ambiguities and conflicts.

Figure 2:
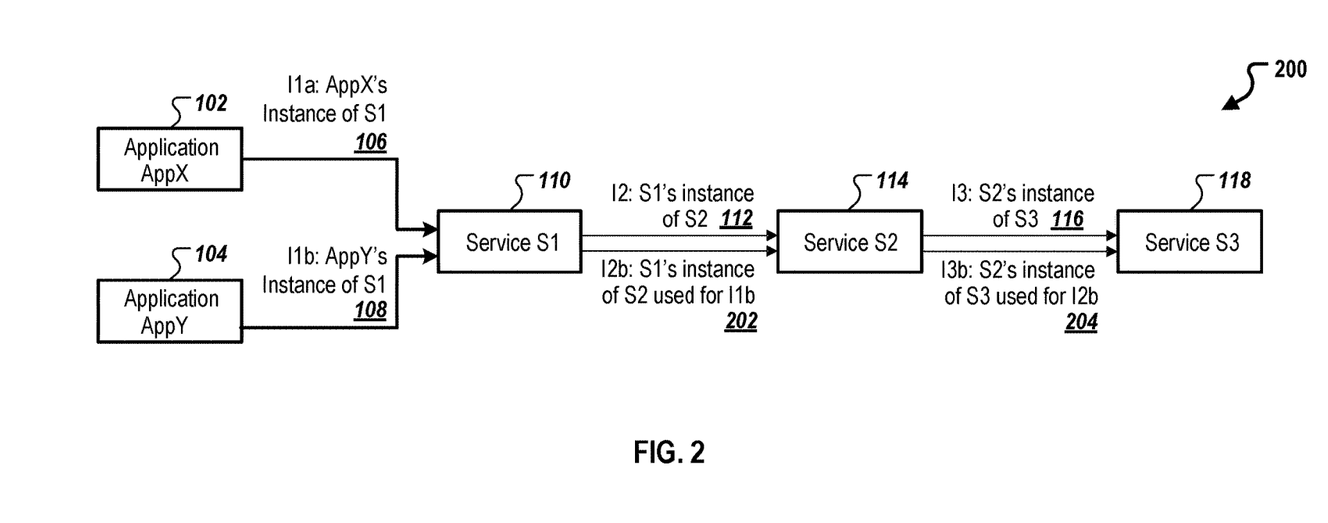
FIG. 2 is a block diagram showing an example of a network of service instances, according to an implementation of the present disclosure.

FIG. 2 is a block diagram showing an example of a network of service instances 200, according to an implementation of the present disclosure. A network of service instances 200 includes use instance indicators 202 and 204 that indicate specific instances of a calling service that use specific instances of an indirectly-consumed service. The use indicator 202 can indicate, for example, that an instance I2b is service S1's instance of a service S2, used for an instance I1b of the service S1. The use indicator 204 can indicate, for example, that an instance I3b is service S2's instance of a service S3, used for an instance I2b of the service S2.

To implement the network of service instances 200, service brokers that provide instances of a service to their consumers also need to create service instances of other services consumed by this service. This means that services can no longer statically bind to the services they consume but need to dynamically create a new service instance for each of its own instances created, such as by leveraging an instance manager. In some solutions, for each service instance provided by a service broker, a separate service instance of each dependent service can be created.

Figure 3:
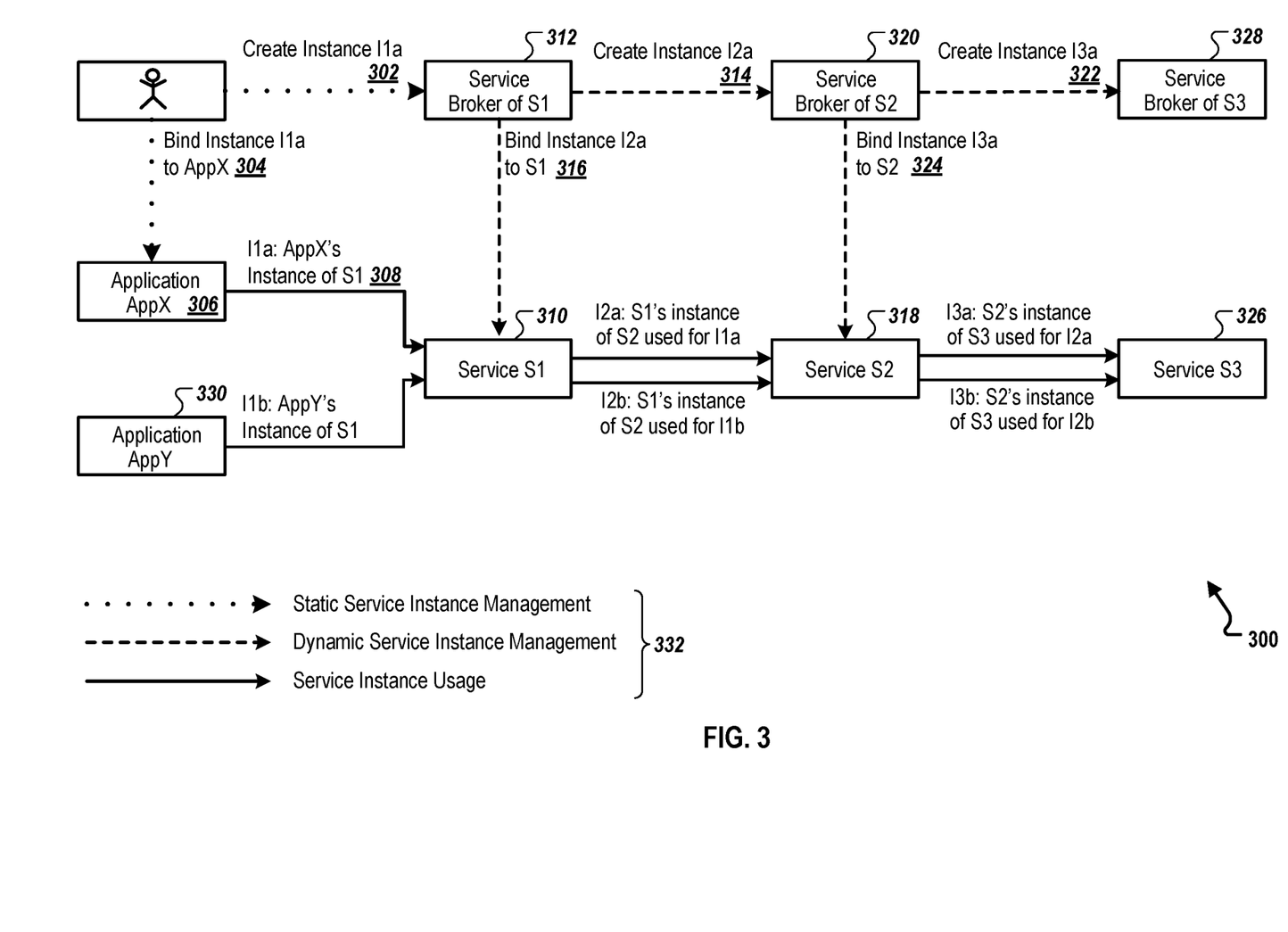
FIG. 3 is a block diagram showing an example of a system in which service brokers cascade the creation of service instance networks, according to an implementation of the present disclosure.

FIG. 3 is a block diagram showing an example of a system 300 in which service brokers cascade the creation of service instance networks, according to an implementation of the present disclosure. For example, when an instance creation 302 occurs for a service used by an application 306, a binding 304 can be used to bind the instance (for example, instance I1a) to the application 306. The creation of an instance 308, can initiate the creation of an instance of a service 310. A service broker 312 can initiate the creation of an instance creation 314 of an indirectly-consumed service (for example, a service 318). The service broker 312 can create a binding 316 that binds the instance of the service 318. When a service broker 320 causes an instance creation 322 of an indirectly-consumed service (for example, a service 326), the service broker 320 creates a binding 324 that binds the instance of the service 326. As will be appreciated by those of ordinary skill in the art, a service broker 328 is able to create more instances and bindings than shown in FIG. 3. Other applications, including an application 330, can also use services of the system 300, including the service 310.

A key 332 identifies line styles that used in FIG. 3. For example, the key 332 can indicate which functions (for example, instantiation and binding) are performed by specific ones of static service instance management, dynamic service instance management, and service instance usage.

Bindings 316 and 324 can allow services to perform isolation of their own instances within a consumed service. For example, a service can consume a single instance of a persistence service (for example, a database schema). The service can separate its own instances by including their instance identifiers (IDs) in the keys of tables and views created in this database service. This is a typical scenario if the service is also tenant-aware and therefore needs to provide proper isolation for both dimensions, instance and tenant. In this case, the service can create an instance of a persistence service per tenant instead of per instance, isolating the instance dimension as described for the persistence model.

In the more common case of stacking tenant-aware services, the tenant dimension can be handled within each tenant-aware service instance. However, cardinalities of service instances need to match in order to propagate this dimension down the stack. Otherwise, in the service of the example, the same instance ID can be persisted for all consuming applications. This can happen if an intermediate service did not cascade its own instances (bound to these applications) but only used one shared instance of that service for itself. As a result, the system 300, as depicted in FIG. 3, can provide the first component of the solution that is needed to solve loss of context information, but a second component of the solution is needed.

A second component of the solution can address the problem in which indirectly-consumed tenant-aware services cannot perform the required setup for their consuming tenants. This is because as the indirectly-consumed tenant-aware services only know about their direct consumers but not their final consumers. This problem can typically occur when services are consumed by a single tenant per service instance, such as in a single-tenant application. For example, single-tenant applications can be the default in Platform as a Service (PaaS) usage scenarios, such as custom development or extensions. In multi-tenant applications, the subscription process can mask the deficiencies described. This is because the subscription process can include a separate callback that notifies the application and all of its dependent services about new tenant subscriptions. However, without an explicit subscription, single-tenant applications must be able to immediately consume new services instances within their tenant. Also, necessary tenant onboarding steps need to be performed implicitly during instance creation.

Figure 4:
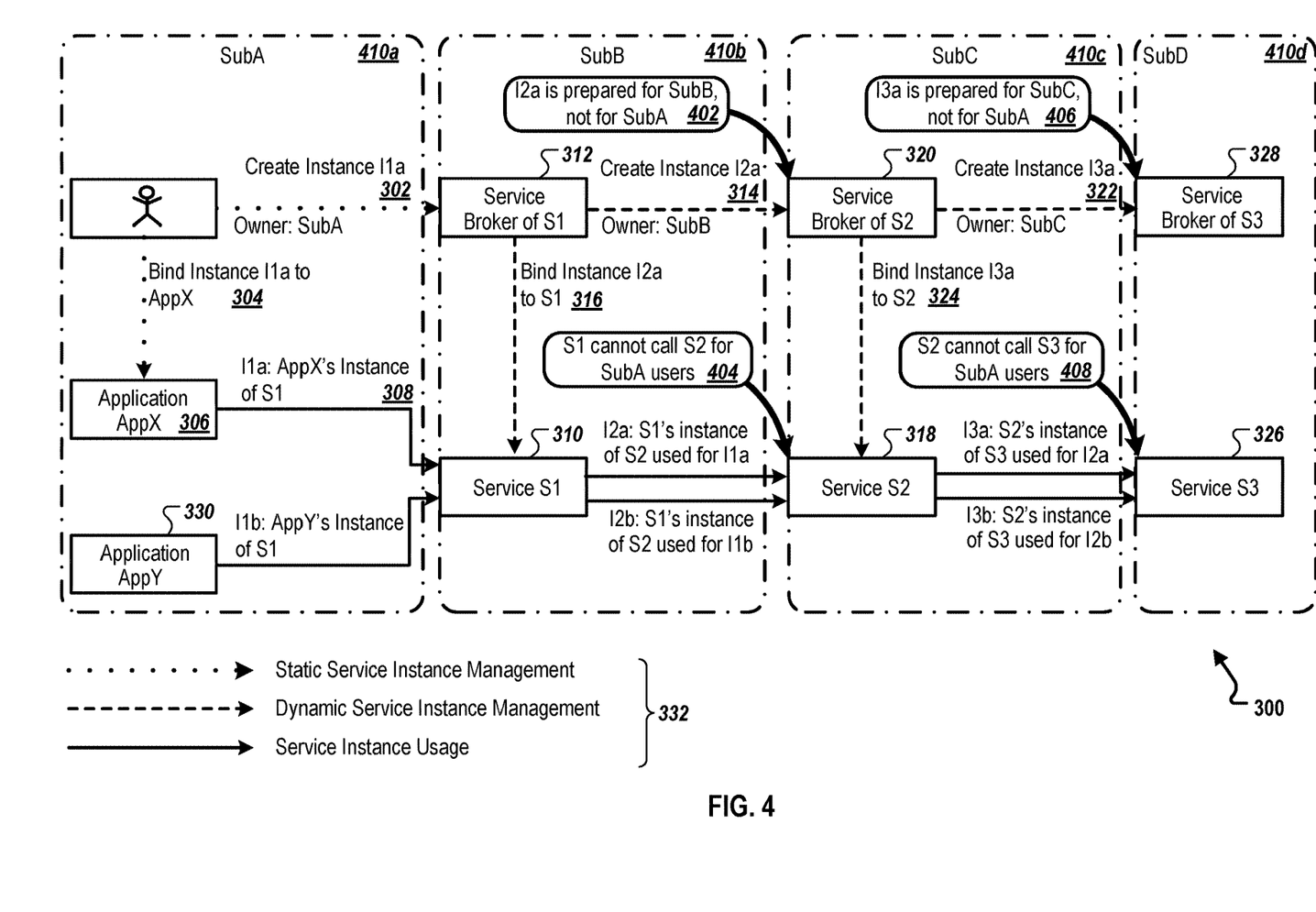
FIG. 4 is a block diagram showing an example of the system showing problems 402-408 encountered in tenant-aware services consumed by single-tenant applications, according to an implementation of the present disclosure.

FIG. 4 is a block diagram showing an example of the system 300 showing problems 402-408 encountered in tenant-aware services consumed by single-tenant applications, according to an implementation of the present disclosure. In this example, instance creation and binding of FIG. 3 are allocated to subaccounts 410a-410d. Specifically, the problem 402 indicates that an instance I2a is prepared for subaccount 410b ("Sub B"), not for subaccount 410a ("Sub A"). The problem 404 indicates that the service 310 (S1) cannot call the service 318 (S2) for Sub A users. The problem 406 indicates that an instance I3a is prepared for subaccount 410c ("Sub C"), not for subaccount 410a ("Sub A"). The problem 408 indicates that the service 318 (S2) cannot call the service 326 (S3) for Sub A users. Preparing an instance for a subaccount in this context means that the subaccount is subscribed to the OAuth client used to authenticate to the service. Without subscription to such an OAuth client, another (unprepared) subaccount cannot get an OAuth access token with which it could call the service. Generally, subaccounts can be used to implement tenants, and the terms can be used interchangeably in this document. For example, the subaccounts 410a-410d can be tenants.

The solution to these problems is to propagate the final consumer tenant ID (for example, identifying subaccount 410a) down the service stack. The consumer tenant ID that represents the direct consumer can be used, for example, for metering and billing to cover the cost for the services consumed by the direct consumer. As indirectly-consumed services are always created dynamically, this additional information about the final consumer only needs to be provided for service instance creations (for example, by using an instance manager). In this example, service instances that are statically created and bound are directly-consumed. Therefore, service brokers that create service instances of services they consume for each of their own instances they provide also need to pass on the tenant ID of the final consumer. In some implementations, if a tenant ID field has not been set yet, the tenant ID can be used.

Figure 5:
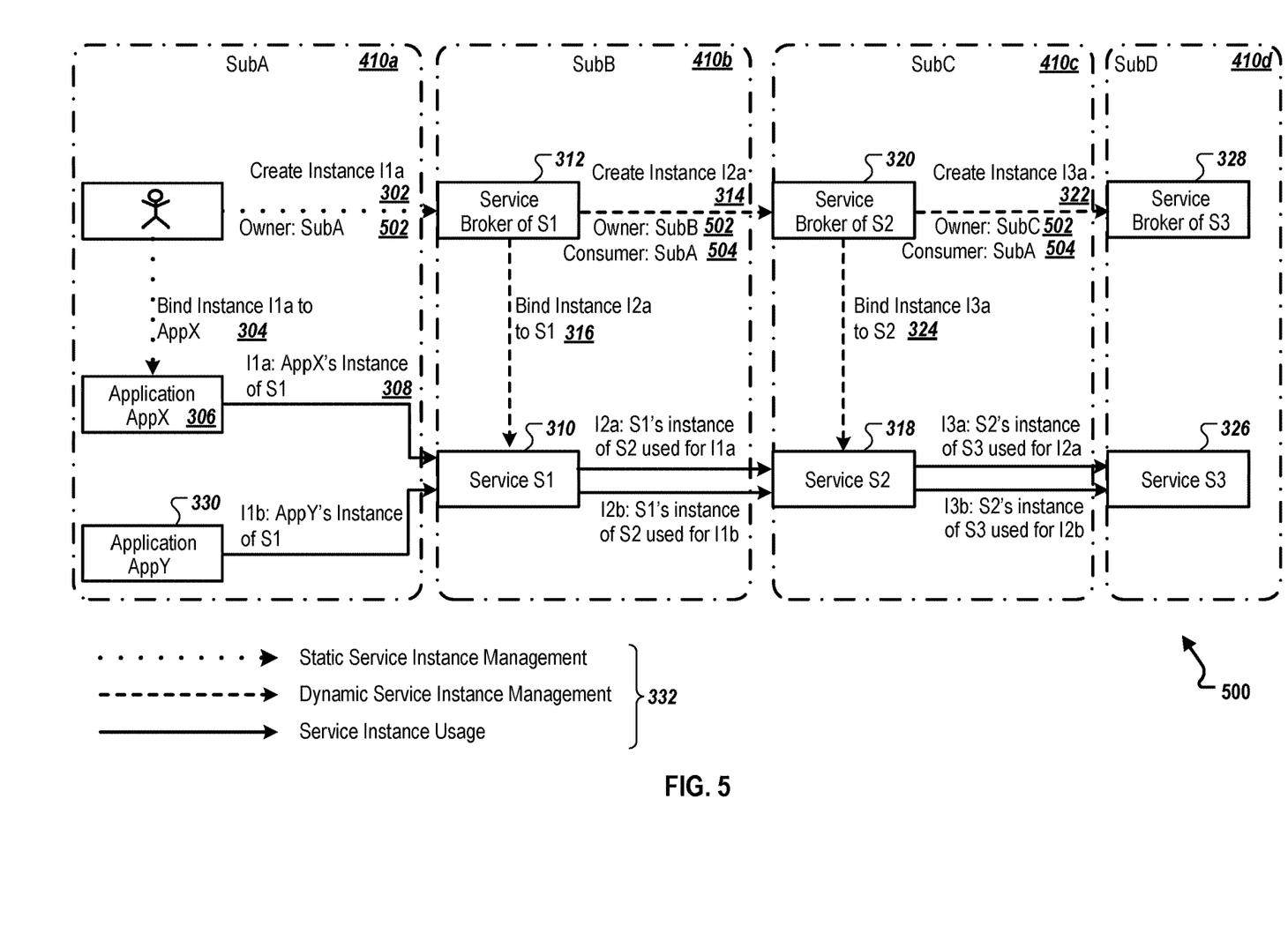
FIG. 5 is a block diagram showing an example of a system that differentiates between owning and consuming subaccounts, according to an implementation of the present disclosure.

FIG. 5 is a block diagram showing an example of a system 500 that differentiates between owning and consuming subaccounts, according to an implementation of the present disclosure. For example, ownership 502 ("Owner: SubA") and consumership 504 ("Consumer: SubA") are established and consumership is propagate throughout the services network. In this way, tenant-aware services identify the ultimate consumer, not only the direct consumer.

The additional information about the final consumer, including the consumership 504, can be used to onboard the tenant, including setting up a persistence for the tenant's data. Additionally, the consumer tenant can be subscribed to the OAuth client that is created for the consumer of the service instance.

In some implementations, a dedicated parameter can be used by an instance manager application programming interface (API) to specify the consumer tenant ID. The consumer tenant ID can be included in a context object, for example, that is passed by a service manager to the next level service broker.

Figure 6:
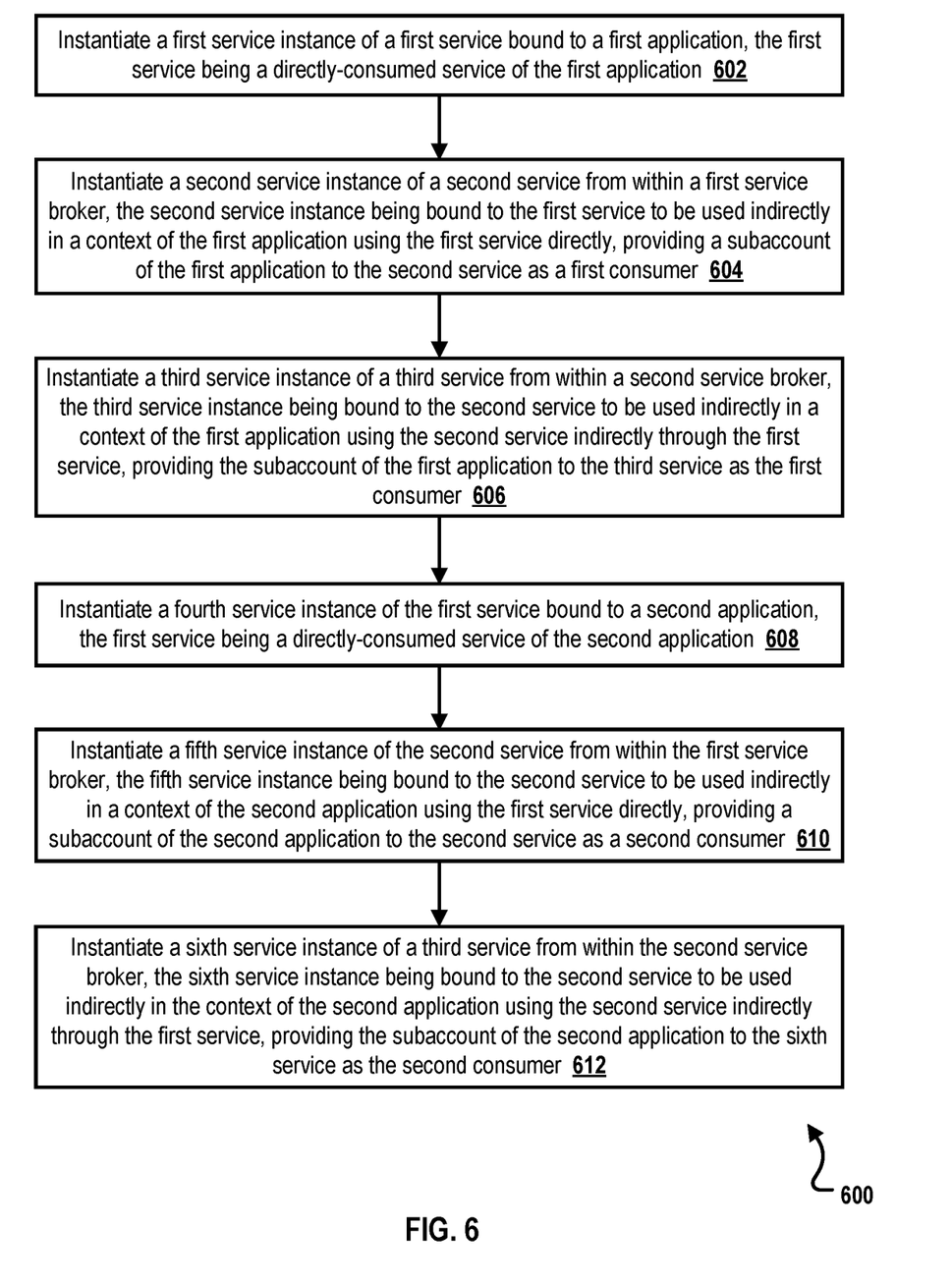
FIG. 6 is a flowchart of an example method for maintaining context information across indirectly-consumed services in the cloud that are used by applications, according to an implementation.

FIG. 6 is a flowchart of an example method 600 for maintaining context information across indirectly-consumed services in the cloud that are used by applications, according to an implementation. For clarity of presentation, the description that follows generally describes method 600 in the context of the other figures in this description. However, it will be understood that method 600 can be performed, for example, by any suitable system, environment, software, and hardware, or a combination of systems, environments, software, and hardware, as appropriate. In some implementations, various steps of method 600 can be run in parallel, in combination, in loops, or in any order.

At 602, a first service instance of a first service bound to a first application is instantiated. The first service is a directly-consumed service of the first application. For example, the instance I1a of the service 310 can be created for use by the application 306. In some implementations, the first service instance of the first service can be instantiated using a static service manager in a first subaccount (for example, the subaccount 410a) to create the first service instance. The first service instance of the first service can be bound to the first application (for example, the application 306). From 602, method 600 proceeds to 604.

At 604, a second service instance of a second service is instantiated from within a first service broker. As an example, the instance I2a of the second service 318 can be created for indirect use by the application 306. The second service instance is bound to the first service. The second service instance is be used indirectly in a context of the first application which uses the first service directly. A subaccount (for example, the subaccount 410a) of the first application is provided to the second service as a first consumer. In some implementations, a dynamic service instance manager can be used to instantiate the second service instance. From 604, method 600 proceeds to 606.

At 606, a third service instance of a third service is instantiated from within a second service broker. The third service can be, for example, the service 326. The third service instance (for example I3a) is bound to the second service to be used indirectly in a context of the first application. The first application uses the third service indirectly through the second service that is used indirectly through the first service. The subaccount of the first application (for example, the subaccount 410a) is provided to the third service as the first consumer. From 606, method 600 proceeds to 608.

At 608, a fourth service instance of the first service bound to a second applications instantiated. For example, the instance I1b of the service 310 can be created for use by the application 330. The first service is a directly-consumed service of the second application. From 608, method 600 proceeds to 610.

At 610, a fifth service instance of the second service is instantiated from within the first service broker. For example, the instance I2b of the second service 318 can be created for indirect use by the application 330. The fifth service instance is bound to the second service that is to be used indirectly in a context of the second application. The second application uses the first service directly. A subaccount (for example, the subaccount 410a) of the second application is provided to the second service as a second consumer. From 610, method 600 proceeds to 612.

At 612, a sixth service instance of a third service is instantiated from within the second service broker. The sixth service can be, for example, the service 326. The sixth service instance (for example, I3b) is bound to the second service to be used indirectly in the context of the second application, for example, the application 330. The second application uses the sixth service indirectly through the fifth service that is used indirectly through the fourth service. The subaccount (for example, the subaccount 410a) of the second application is provided to the sixth service as the second consumer. After 612, method 600 can stop.

Figure 7:
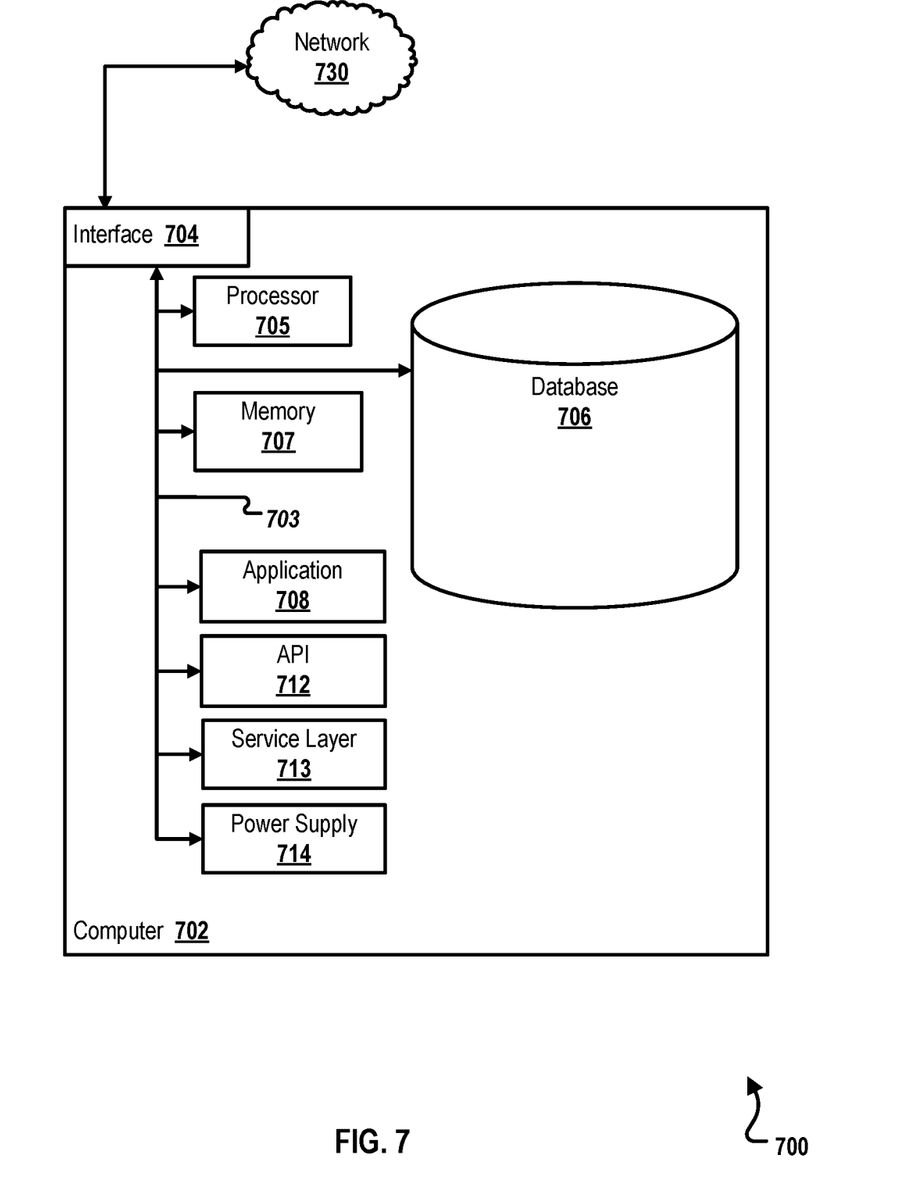
FIG. 7 is a block diagram illustrating an example computer system used to provide computational functionalities associated with described algorithms, methods, functions, processes, flows, and procedures as described in the instant disclosure, according to an implementation of the present disclosure.

FIG. 7 is a block diagram of an example computer system 700 used to provide computational functionalities associated with described algorithms, methods, functions, processes, flows, and procedures, as described in the instant disclosure, according to an implementation. The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 702 can comprise a computer that includes an input device, such as a keypad, keyboard, touch screen, or other device that can accept user information, and an output device that conveys information associated with the operation of the computer 702, including digital data, visual, or audio information (or a combination of information), or a graphical-type user interface (UI) (or GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 can be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 can also include or be communicably coupled with an application server, e-mail server, web server, caching server, streaming data server, or other server (or a combination of servers).

The computer 702 can receive requests over network 730 from a client application (for example, executing on another computer 702) and respond to the received requests by processing the received requests using an appropriate software application(s). In addition, requests can also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, hardware or software (or a combination of both hardware and software), can interface with each other or the interface 704 (or a combination of both), over the system bus 703 using an application programming interface (API) 712 or a service layer 713 (or a combination of the API 712 and service layer 713). The API 712 can include specifications for routines, data structures, and object classes. The API 712 can be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, or other suitable language providing data in extensible markup language (XML) format or other suitable format. While illustrated as an integrated component of the computer 702, alternative implementations can illustrate the API 712 or the service layer 713 as stand-alone components in relation to other components of the computer 702 or other components (whether or not illustrated) that are communicably coupled to the computer 702. Moreover, any or all parts of the API 712 or the service layer 713 can be implemented as child or sub-modules of another software module, enterprise application, or hardware module without departing from the scope of this disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with other systems that are connected to the network 730 (whether illustrated or not) in a distributed environment. Generally, the interface 704 comprises logic encoded in software or hardware (or a combination of software and hardware) and is operable to communicate with the network 730. More specifically, the interface 704 can comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). Memory 707 can store any data consistent with this disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same or combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or other power management functionality). In some implementations, the power-supply 714 can include a power plug to allow the computer 702 to be plugged into a wall socket or other power source to, for example, power the computer 702 or recharge a rechargeable battery.

There can be any number of computers 702 associated with, or external to, a computer system containing computer 702, each computer 702 communicating over network 730. Further, the term "client," "user," and other appropriate terminology can be used interchangeably, as appropriate, without departing from the scope of this disclosure. Moreover, this disclosure contemplates that many users can use one computer 702, or that one user can use multiple computers 702.

Described implementations of the subject matter can include one or more features, alone or in combination.

For example, in a first implementation, a computer-implemented method, comprising: instantiating a first service instance of a first service bound to a first application, the first service being a directly-consumed service of the first application; instantiating a second service instance of a second service from within a first service broker, the second service instance being bound to the first service to be used indirectly in a context of the first application using the first service directly, providing a subaccount of the first application to the second service as a first consumer; instantiating a third service instance of a third service from within a second service broker, the third service instance being bound to the second service to be used indirectly in a context of the first application using the second service indirectly through the first service, providing the subaccount of the first application to the third service as the first consumer; instantiating a fourth service instance of the first service bound to a second application, the first service being a directly-consumed service of the second application; instantiating a fifth service instance of the second service from within the first service broker, the fifth service instance being bound to the second service to be used indirectly in a context of the second application using the first service directly, providing a subaccount of the second application to the second service as a second consumer; and instantiating a sixth service instance of a third service from within the second service broker, the sixth service instance being bound to the second service to be used indirectly in the context of the second application using the second service indirectly through the first service, providing the subaccount of the second application to the sixth service as the second consumer.

The foregoing and other described implementations can each, optionally, include one or more of the following features:

A first feature, combinable with any of the following features, further comprising binding, using a static service instance manager, the first service instance to the first application.

A second feature, combinable with any of the previous or following features, wherein instantiating the first service instance includes using a static service instance manager to instantiate the first service instance.

A third feature, combinable with any of the previous or following features, further comprising binding, using a dynamic service instance manager, the second service instance to the first application.

A fourth feature, combinable with any of the previous or following features, wherein a dynamic service instance manager is used to instantiate the second service instance.

A fifth feature, combinable with any of the previous or following features, further comprising passing, by a service manager from the first service broker to the second service broker, a consumer tenant identifier (ID) included in a context object.

A sixth feature, combinable with any of the previous or following features, wherein an application programming interface (API) is used to pass the consumer tenant ID and the context object.

In a second implementation, non-transitory, computer-readable medium storing one or more instructions executable by a computer system to perform operations comprising: instantiating a first service instance of a first service bound to a first application, the first service being a directly-consumed service of the first application; instantiating a second service instance of a second service from within a first service broker, the second service instance being bound to the first service to be used indirectly in a context of the first application using the first service directly, providing a subaccount of the first application to the second service as a first consumer; instantiating a third service instance of a third service from within a second service broker, the third service instance being bound to the second service to be used indirectly in a context of the first application using the second service indirectly through the first service, providing the subaccount of the first application to the third service as the first consumer; instantiating a fourth service instance of the first service bound to a second application, the first service being a directly-consumed service of the second application; instantiating a fifth service instance of the second service from within the first service broker, the fifth service instance being bound to the second service to be used indirectly in a context of the second application using the first service directly, providing a subaccount of the second application to the second service as a second consumer; and instantiating a sixth service instance of a third service from within the second service broker, the sixth service instance being bound to the second service to be used indirectly in the context of the second application using the second service indirectly through the first service, providing the subaccount of the second application to the sixth service as the second consumer.

The foregoing and other described implementations can each, optionally, include one or more of the following features:

A first feature, combinable with any of the following features, the operations further comprising binding, using a static service instance manager, the first service instance to the first application.

A second feature, combinable with any of the previous or following features, wherein instantiating the first service instance includes using a static service instance manager to instantiate the first service instance.

A third feature, combinable with any of the previous or following features, the operations further comprising binding, using a dynamic service instance manager, the second service instance to the first application.

A fourth feature, combinable with any of the previous or following features, wherein a dynamic service instance manager is used to instantiate the second service instance.

A fifth feature, combinable with any of the previous or following features, the operations further comprising passing, by a service manager from the first service broker to the second service broker, a consumer tenant identifier (ID) included in a context object.

A sixth feature, combinable with any of the previous or following features, wherein an application programming interface (API) is used to pass the consumer tenant ID and the context object.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform operations comprising: instantiating a first service instance of a first service bound to a first application, the first service being a directly-consumed service of the first application; instantiating a second service instance of a second service from within a first service broker, the second service instance being bound to the first service to be used indirectly in a context of the first application using the first service directly, providing a subaccount of the first application to the second service as a first consumer; instantiating a third service instance of a third service from within a second service broker, the third service instance being bound to the second service to be used indirectly in a context of the first application using the second service indirectly through the first service, providing the subaccount of the first application to the third service as the first consumer; instantiating a fourth service instance of the first service bound to a second application, the first service being a directly-consumed service of the second application; instantiating a fifth service instance of the second service from within the first service broker, the fifth service instance being bound to the second service to be used indirectly in a context of the second application using the first service directly, providing a subaccount of the second application to the second service as a second consumer; and instantiating a sixth service instance of a third service from within the second service broker, the sixth service instance being bound to the second service to be used indirectly in the context of the second application using the second service indirectly through the first service, providing the subaccount of the second application to the sixth service as the second consumer.

The foregoing and other described implementations can each, optionally, include one or more of the following features:

A first feature, combinable with any of the following features, the operations further comprising binding, using a static service instance manager, the first service instance to the first application.

A second feature, combinable with any of the previous or following features, wherein instantiating the first service instance includes using a static service instance manager to instantiate the first service instance.

A third feature, combinable with any of the previous or following features, the operations further comprising binding, using a dynamic service instance manager, the second service instance to the first application.

A fourth feature, combinable with any of the previous or following features, wherein a dynamic service instance manager is used to instantiate the second service instance.

A fifth feature, combinable with any of the previous or following features, the operations further comprising passing, by a service manager from the first service broker to the second service broker, a consumer tenant identifier (ID) included in a context object.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory can include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 702.11x and 702.20 or other protocols consistent with this disclosure), all or a portion of the Internet, or any other communication system or systems at one or more locations (or a combination of communication networks). The network can communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
instantiating a first service instance of a first service bound to a first application, the first service being a directly-consumed service of the first application;
instantiating a second service instance of a second service from within a first service broker, the second service instance being bound to the first service to be used indirectly in a context of the first application using the first service directly, providing a subaccount of the first application to the second service as a first consumer;
instantiating a third service instance of a third service from within a second service broker, the third service instance being bound to the second service to be used indirectly in a context of the first application using the second service indirectly through the first service, providing the subaccount of the first application to the third service as the first consumer;
instantiating a fourth service instance of the first service bound to a second application, the first service being a directly-consumed service of the second application;
instantiating a fifth service instance of the second service from within the first service broker, the fifth service instance being bound to the second service to be used indirectly in a context of the second application using the first service directly, providing a subaccount of the second application to the second service as a second consumer; and
instantiating a sixth service instance of a third service from within the second service broker, the sixth service instance being bound to the second service to be used indirectly in the context of the second application using the second service indirectly through the first service, providing the subaccount of the second application to the sixth service as the second consumer.

2. The computer-implemented method of claim 1, further comprising binding, using a static service instance manager, the first service instance to the first application.

3. The computer-implemented method of claim 1, wherein instantiating the first service instance includes using a static service instance manager to instantiate the first service instance.

4. The computer-implemented method of claim 1, further comprising binding, using a dynamic service instance manager, the second service instance to the first application.

5. The computer-implemented method of claim 1, wherein a dynamic service instance manager is used to instantiate the second service instance.

6. The computer-implemented method of claim 1, further comprising passing, by a service manager from the first service broker to the second service broker, a consumer tenant identifier (ID) included in a context object.

7. The computer-implemented method of claim 6, wherein an application programming interface (API) is used to pass the consumer tenant ID and the context object.

8. A non-transitory, computer-readable medium storing one or more instructions executable by a computer system to perform operations comprising:
instantiating a first service instance of a first service bound to a first application, the first service being a directly-consumed service of the first application;
instantiating a second service instance of a second service from within a first service broker, the second service instance being bound to the first service to be used indirectly in a context of the first application using the first service directly, providing a subaccount of the first application to the second service as a first consumer;
instantiating a third service instance of a third service from within a second service broker, the third service instance being bound to the second service to be used indirectly in a context of the first application using the second service indirectly through the first service, providing the subaccount of the first application to the third service as the first consumer;
instantiating a fourth service instance of the first service bound to a second application, the first service being a directly-consumed service of the second application;
instantiating a fifth service instance of the second service from within the first service broker, the fifth service instance being bound to the second service to be used indirectly in a context of the second application using the first service directly, providing a subaccount of the second application to the second service as a second consumer; and
instantiating a sixth service instance of a third service from within the second service broker, the sixth service instance being bound to the second service to be used indirectly in the context of the second application using the second service indirectly through the first service, providing the subaccount of the second application to the sixth service as the second consumer.

9. The non-transitory, computer-readable medium of claim 8, the operations further comprising binding, using a static service instance manager, the first service instance to the first application.

10. The non-transitory, computer-readable medium of claim 8, wherein instantiating the first service instance includes using a static service instance manager to instantiate the first service instance.

11. The non-transitory, computer-readable medium of claim 8, the operations further comprising binding, using a dynamic service instance manager, the second service instance to the first application.

12. The non-transitory, computer-readable medium of claim 8, wherein a dynamic service instance manager is used to instantiate the second service instance.

13. The non-transitory, computer-readable medium of claim 8, the operations further comprising passing, by a service manager from the first service broker to the second service broker, a consumer tenant identifier (ID) included in a context object.

14. The non-transitory, computer-readable medium of claim 13, wherein an application programming interface (API) is used to pass the consumer tenant ID and the context object.

15. A computer-implemented system, comprising:
one or more computers; and
one or more computer memory devices interoperably coupled with the one or more computers and having tangible, non-transitory, machine-readable media storing instructions that, when executed by the one or more computers, perform operations comprising:
instantiating a first service instance of a first service bound to a first application, the first service being a directly-consumed service of the first application;
instantiating a second service instance of a second service from within a first service broker, the second service instance being bound to the first service to be used indirectly in a context of the first application using the first service directly, providing a subaccount of the first application to the second service as a first consumer;

instantiating a third service instance of a third service from within a second service broker, the third service instance being bound to the second service to be used indirectly in a context of the first application using the second service indirectly through the first service, providing the subaccount of the first application to the third service as the first consumer;

instantiating a fourth service instance of the first service bound to a second application, the first service being a directly-consumed service of the second application;

instantiating a fifth service instance of the second service from within the first service broker, the fifth service instance being bound to the second service to be used indirectly in a context of the second application using the first service directly, providing a subaccount of the second application to the second service as a second consumer; and instantiating a sixth service instance of a third service from within the second service broker, the sixth service instance being bound to the second service to be used indirectly in the context of the second application using the second service indirectly through the first service, providing the subaccount of the second application to the sixth service as the second consumer.

16. The computer-implemented system of claim 15, the operations further comprising binding, using a static service instance manager, the first service instance to the first application.

17. The computer-implemented system of claim 15, wherein instantiating the first service instance includes using a static service instance manager to instantiate the first service instance.

18. The computer-implemented system of claim 15, the operations further comprising binding, using a dynamic service instance manager, the second service instance to the first application.

19. The computer-implemented system of claim 15, wherein a dynamic service instance manager is used to instantiate the second service instance.

20. The computer-implemented system of claim 15, the operations further comprising passing, by a service manager from the first service broker to the second service broker, a consumer tenant identifier (ID) included in a context object.

* * * * *